Feb. 3, 1959 C. V. SCIULLO 2,871,492
METHOD OF FORGING A NUT BLANK HAVING A BORE
WITH A PROJECTING KEY
Filed July 24, 1956 3 Sheets-Sheet 3
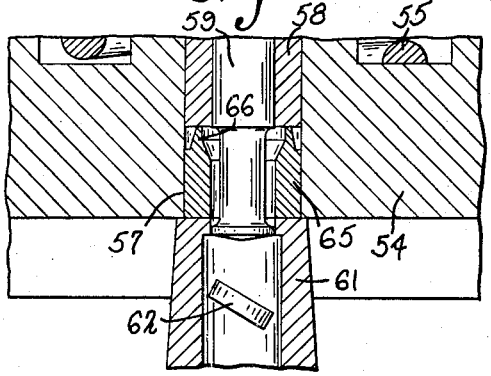
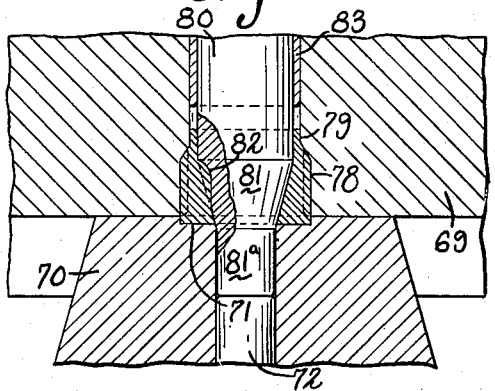
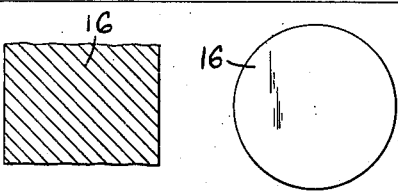
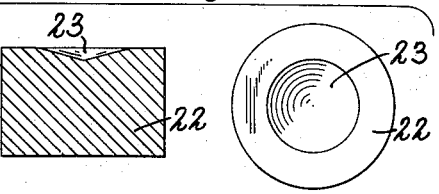
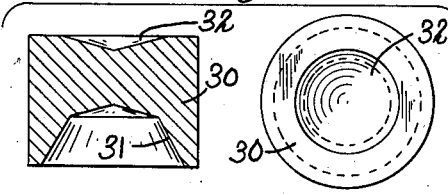
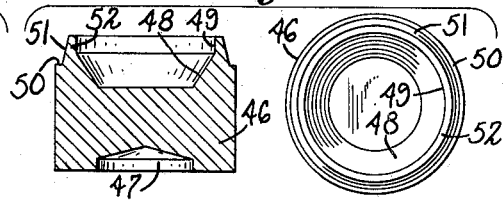
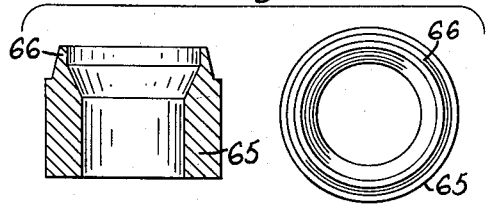
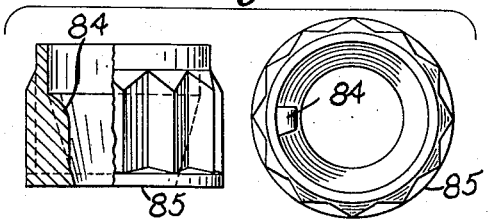
INVENTOR
Charles V. Sciullo
BY Rockwell & Burkholder
ATTORNEYS

United States Patent Office 2,871,492
Patented Feb. 3, 1959

2,871,492

METHOD OF FORGING A NUT BLANK HAVING A BORE WITH A PROJECTING KEY

Charles Vincent Sciullo, Waterbury, Conn., assignor to The Waterbury Farrel Foundry & Machine Company, Waterbury, Conn., a corporation of Connecticut Application July 24, 1956, Serial No. 599,831

2 Claims. (Cl. 10—86)

This invention relates to an apparatus for and method of making nut blanks, and more particularly to the making of a nut blank provided with an internal key whereby a threaded sleeve member may be received in the bore of the body of the blank and nonrotatably secured to the body by this key.

The nut blank which is the subject matter of the present application is shown more particularly in Fig. 13, and it may be noted that the bore of the body of the blank is tapered as well as being provided with the key above referred to, and upon its exterior surface is provided with a plurality of flat faces intersecting in sharp corners, there being, as shown, twelve of such faces so that a duohexagonal nut is formed.

The present invention relates particularly to the formation of the outer body portion of the completed nut, and involves a method of and an apparatus for making a blank of this character progressively in a series of steps in a forming machine provided with a plurality of dies or die stations, the blank being carried from one station to another by suitable transfer mechanism of known type. In the present method of manufacturing such a nut blank, a workpiece is cut from a length of wire or rod stock which, as shown, is of circular shape, and this round or cylindrical exterior shape of the workpiece is maintained throughout the manufacture of the blank until the last operation is performed. In this last operation the shape of the internal bore through the blank is finally perfected and at the same time the exterior of the blank is formed into duohexagonal shape as shown.

The method is somewhat similar to that which might be followed if a tubular workpiece were to be cut from a piece of tubing and shaped as shown by known processes until given its final shape as is done in the present instance at the last station of the machine. In other words, the blank as presented to this last station to be finally formed is one of substantially tubular shape. As it is difficult to cut tubing as such in a heading machine, the present process gives essentially the same result but employs solid stock as distinguished from tubular stock.

As stated, the nut body is provided with a duohexagon or twelve-sided external surface which at its lower end merges into a round washer face so that a wrench may be applied to the external surface of the completed nut body to draw it tightly into place.

One object of the present invention is to provide a novel method of making a nut blank having a tapered bore with an internal key member and a skirt portion above the bore.

Still another object of the invention is to provide a novel method of making a nut blank having a tapered bore provided with an internal key projecting into the bore and a duohexagonal or twelve-sided external surface.

A further object of the invention is the provision of a new and improved method of making a nut as above set forth wherein the workpiece is cut from round stock and the external round or circular shape of the workpiece is maintained throughout a number of operations performed in the process of making the nut.

A further object of the invention is the provision of a new and improved nut-forming machine for forming a duohexagon nut having a tapered internal bore provided with an inwardly projecting key in a series of steps at succeeding die stations in the machine, the blank being maintained in round form until the final station of the machine, at which time the form of the blank is perfected with a noncircular external surface.

To these and other ends the invention consists in the novel features and combinations of parts to be hereinafter described and claimed.

In the accompanying drawings:

Fig. 6 is an enlarged sectional view of the tools and blank at the fourth forming station of the machine;

Fig. 7 is a sectional view of the tools and blank employed at the fifth and last station of the machine;

Fig. 8 is a sectional and plan view of the workpiece when cut from the rod or wire stock; and Figs. 9 to 13 represent respectively sectional and plan views of the workpiece at stations 1 to 5 of the machine.

Figure 1:
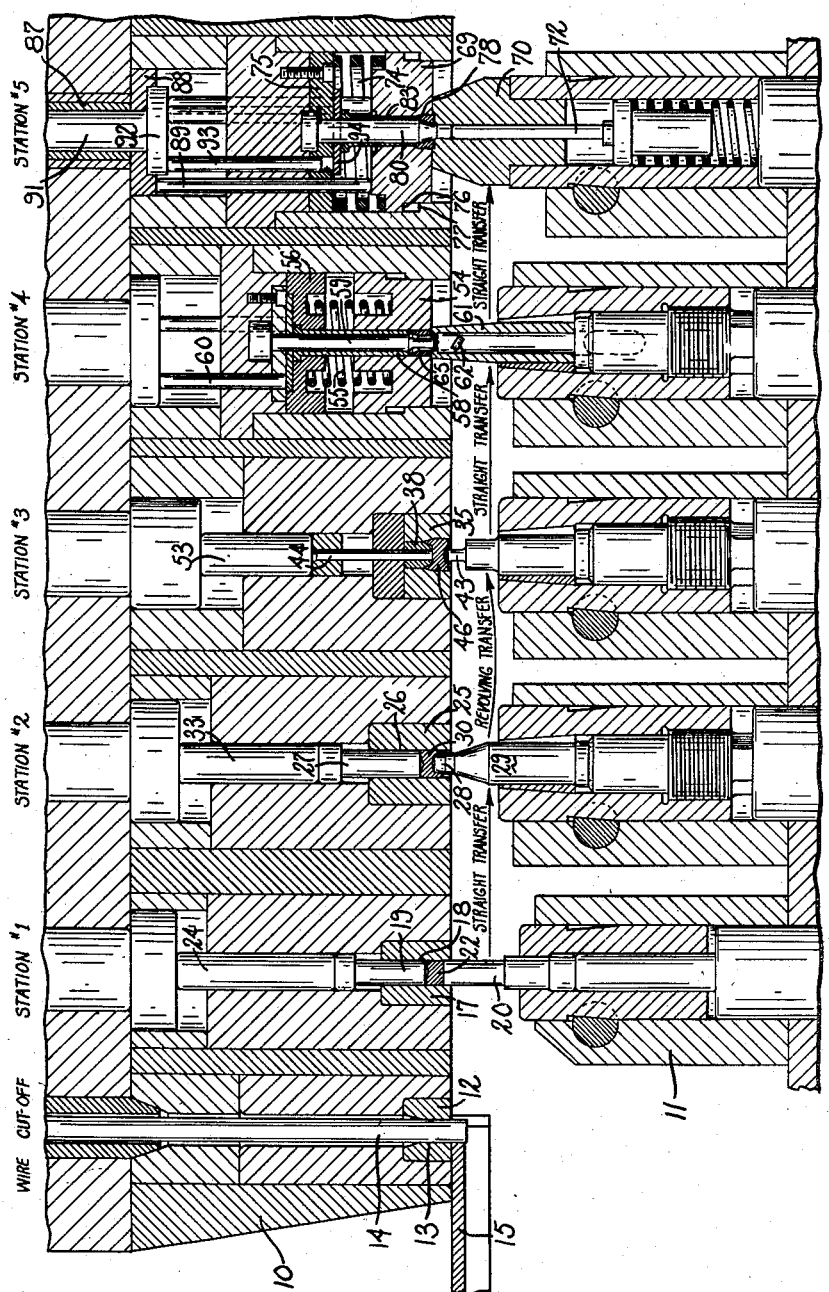
Fig. 1 is a sectional view of a portion of a nut-forming machine for making a nut blank, the view being a horizontal sectional view through the dies and punches.

To illustrate one embodiment of the device for forming the nut and the improved method employed, I have shown in Fig. 1 of the drawing a nut-blank-forming machine comprising a die bed 10 and a gate 11 which it will be understood is reciprocably mounted to move toward and from the die bed. In the die bed is mounted the usual cut-off die 12 having an opening 13 through which may extend the wire or rod stock 14 so that a workpiece may be severed from the projecting end of the stock by the cut-off knife 15. This workpiece is shown in sectional and plan views at 16 in Fig. 8 and, as noted, it is of circular shape in cross section.

Also mounted in the die block are a plurality of dies positioned, as shown, in the same horizontal plane to which the workpiece is progressively carried, as will be hereinafter explained. The transfer from one station to another may be made by the usual transfer mechanism which will preferably be provided with means for rotating the blank during its transfer between certain of the stations. It will be understood that the workpiece 16 which is severed from the length of stock at the cut-off station will be carried by the knife or severing member 15 to the next station designated as station No. 1.

At this station a die 17 is provided, this die having an opening 18 within which is received a pin 19 reciprocably mounted in the die bed and a pin or punch 20 mounted in the gate 11.

The operation at this station serves principally to square the ends of the workpiece, the shape of the latter being shown at 22 in Fig. 9 where it will be seen that it has been indented slightly at the die face of the blank, as shown at 23. Also the workpiece may be slightly upset at this station so as to be of slightly larger diameter than the workpiece 16.

After the operation at station No. 1 the blank is ejected from the die 17 by the knock-out rod 24 and carried, without turning, to a position in front of the die 25 mounted in the die bed at station No. 2. The die 25 is provided with a cylindrical opening 26 which receives the pin 27 in its inner end and the end 28 of a punch 29 carried by the gate in its outer end. The blank 22 is pushed into the die 25 by the punch 29 against the pin 27.

Figure 3:
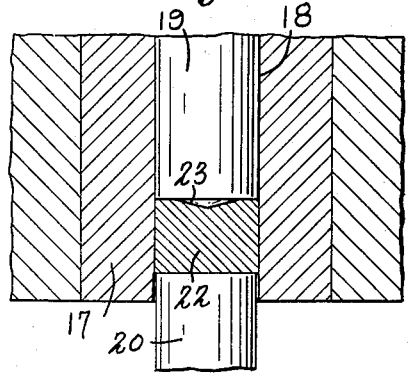
Fig. 3 is an enlarged sectional view of the tools and blank at the first forming station of the machine.
Figure 4:
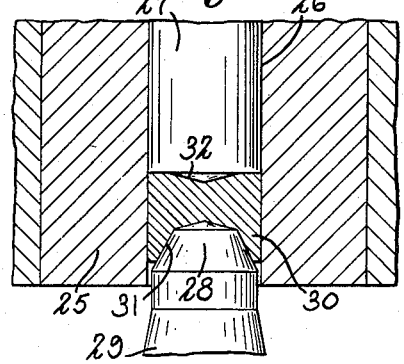
Fig. 4 is an enlarged sectional view of the tools and blank at the second forming station of the machine.
Figure 5:
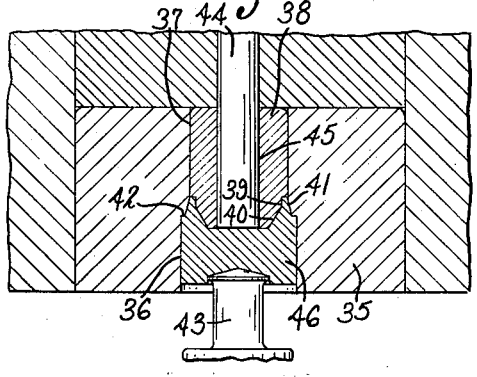
Fig. 5 is an enlarged sectional view of the tools and blank at the third forming station of the machine.

The operation at station No. 2 is an indenting operation, and it will be seen that the end 28 of the punch 29 forms an indentation in the punch face of the blank, as shown in Figs. 3 and 10. The shape of the blank after this operation is indicated at 30, and it will be seen that its outer or punch face is provided with a relatively deep indentation 31, the walls of which taper outwardly while at its die face the blank is slightly indented as shown at 32 by the conical end of the pin 27. As the opening in the die 26 is of circular shape, the circular or cylindrical shape of the blank is still maintained at this station.

The blank 30 is then ejected from station No. 2 by action of the punch 33 which may be actuated by any well-known means and is transferred to station No. 3. During this transfer from the second to the third stations of the machine the blank is revolved or turned end for end so that the face of the blank having the indentation 31 becomes the die face of the blank at station No. 3. At this station there is provided a die 35 having a circular opening which is slightly larger at its outer end, as shown at 36, than at its inner end 37. Within the smaller inner portion 37 of the die is a die insert 38 having an outer portion 39 of reduced diameter and beyond the portion 39 a tapered portion 40 decreasing in size toward its outer end. It will also be noted that the die opening between its outer end of larger diameter and inner end of smaller diameter is provided with a tapered wall 41 terminating in an inwardly directed annular shoulder 42.

The blank 30, as shown in Fig. 10, is forced into the die 35 by the punch 43 secured in the gate 11 against the die insert 38 and the pin 44 which extends through an opening 45 in the insert 38. The blank is thus formed into the shape shown at 46 in Fig. 11. From this figure it will be noted that the outer face of the blank is slightly indented, as shown at 47, while at its inner face it is provided with an indentation having a tapered portion 48 and an outer cylindrical portion 49. At its outer surface the blank is provided with an annular shoulder 50 and a tapered wall 51 providing a skirt 52 surrounding the indentation at the inner face of the blank. The exterior surface of the blank is still of circular shape conforming to the circular opening of the die 35.

The blank is ejected from the die 35 by the knock-out rod 53 actuated in any suitable manner and transferred without turning to station No. 4 where, as will be described, it is pierced to provide an opennig through it, thus rendering it substantially a tubular workpiece.

At this station the machine is provided with a collapsing die 54 movably mounted in the die bed and urged outwardly by a spring 55, acting against a plate 56. The die 54 also is provided with an opening 57 of circular shape which is adapted to receive in its inner end a sleeve 58 within which is mounted a piercing punch 59. It will be noted that the punch 59 is stationary in the machine, while the plate 56 which carries the sleeve 58 may be moved outwardly by the ejector pins 60 in order to eject the blank from the die as will be explained hereinafter. A hollow punch 61 is mounted in the die bed at this station to force the workpiece into the die 54.

When the blank shown at 46 in Fig. 11 has been transferred to station No. 4, the punch 61 moves forwardly and drives the blank into the opening 57 in the die 54, causing this die, the face of which has previously registered with the face of the die block, to be moved inwardly against the action of the spring 55, as shown at station No. 4. At this time the blank has been forced over the end of punch 59 to pierce the slug 62 from the center of the blank, the latter being driven against the outer end of the sleeve 58, the piercing punch 59 remaining stationary. The slug 62 is driven into the punch 61 to be discharged therefrom in the usual manner.

When the punch 61 recedes the spring 55 urges the die 54 forwardly, and the knock-out pins 60 are advanced against the plate 56 which drives the sleeve 58 forwardly to strip the blank from the die 54. The slug 62 is discharged into the punch and subsequently discharged from the punch holder 63 through the opening 64.

The blank is now pierced, as shown at 65 in Fig. 12, and is essentially a tubular member provided with the tapered skirt portion 66 of substantially the same exterior configuration as the blank 46 shown in Fig. 11. This blank is then transferred without turning to station No. 5 where it is driven into a finishing die 69 by a punch 70, the punch being slightly recessed as shown at 71. The punch is carried by the gate 11 and is provided with a pin 72. As the blank is of circular form through the operations heretofore described, no care needs to be exercised to orient it with respect to the dies.

At station No. 5 the die 69 is of the collapsing or sliding type and is urged outwardly by the spring 74 reacting against the block 75. Outward movement of the die is limited by contact of the shoulder 76 with the shoulder 77 provided in the opening in the die holder. The die 69 is provided with an opening of duohexagonal form at its lower end, as shown at 78, and is of circular cross section and slightly reduced in size adjacent its upper end, as shown at 79 in Fig. 7.

At this station there is provided a forming pin or punch 80 having a tapered end portion 81 in which is formed a recess or keyway 82 to effect the formation of an inwardly extending key in the bore of the blank. Surrounding this punch is a sleeve 83, which sleeve is movable with respect to the die bed while the pin 80 is fixed in the die bed.

At the beginning of a forming operation at this station the die 69 is in its outer position where its face is flush with the face of the die bed. The punch 70 engages the blank 65 and forces it into the opening into the die 69. Upon continued forward movement of the punch the die 69 and blank are moved rearwardly against the action of the spring 74, thus forcing the blank up over the tapering key punch 80 so as to form a tapered opening in the blank and also form the key shown at 84, Fig. 13. Simultaneously the blank is expanded laterally and finished into duohexagonal shape with sharp corners or edges. At the same time the recess in the punch completes the lower washer face shown at 85. The position of the tools at the completion of this operation is shown in Figs. 1 and 7 where it will be noted that a lower end portion 81$^a$ of the punch 80 is telescoped into the opening or recess of the punch 70.

The ejection of the blank from the die is effected in two steps as the blank clings firmly to the forming punch and die. Slidably mounted in the die bed is a sleeve or bushing 87 (Figs. 1 and 2), which bushing acts at its lower end upon a plate 88 which in turn drives forwardly the pins 89, these pins bearing at their outer ends against the die 69. This drives the die and the blank forwardly, breaking the bond between the blank and the forming punch and causes the die to register with the face of the die block carrying the blank with it. During this motion the key-forming punch 80 and sleeve or bushing 83 remain stationary.

Thereafter the knock-out rod 91 is moved forwardly, which rod acts upon the plate 92 and drives pins 93 forwardly, which pins rest at their rear ends against this plate. At their forward ends the pins 93 engage the plate 94 at the rear end of the sleeve 83 so as to drive this sleeve forwardly with respect to the punch and eject it from the die 69. It is noted that the ends of the pins 93 are spaced inwardly from the plate 94 so as to provide a lag between the actuation of the die 69 and that of the bushing 83.

Figure 2:
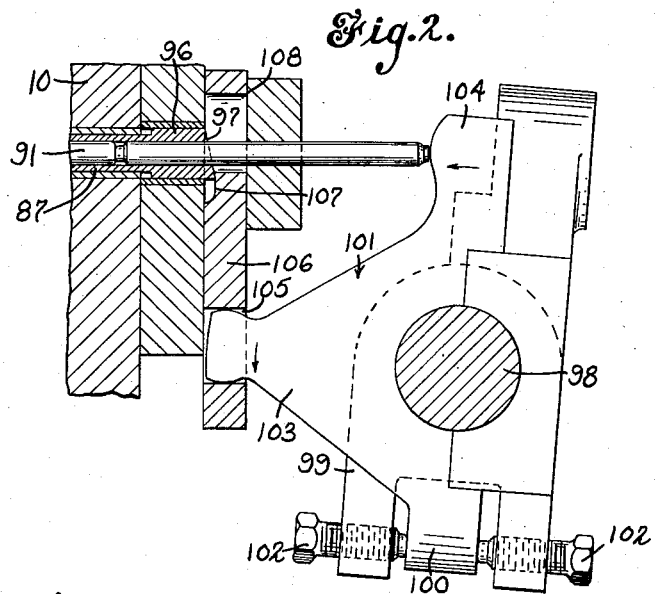
Fig. 2 is a view showing a portion of the means for ejecting the blank from the last station of the machine.

It will be seen from Fig. 2 that the bushing 87 extends rearwardly from the die block and is provided with a head 96 having a cam surface 97, while the knock-out rod 91 also extends rearwardly from the die bed, as shown in this figure. A rock shaft 98 is rockably mounted in the frame of the machine and designed to be oscillated by the usual cam mechanism so that this member will be moved in timed relation with the gate of the machine which carries the punches. Upon the shaft 98 is secured a U-shaped clevis member 99 between the legs of which projects a lug 100 on a rocker member 101 loosely mounted upon the shaft 98. Adjusting screws 102 threaded in the spaced lugs of the clevis 99 bear at their inner ends against the lug 100 so as to properly adjust the rocker member 101. This member is provided with arms 103 and 104 which, when the rocker is rocked about the axis of the shaft 98, will effect the two-step ejection of the blank.

The arm 103 of the rocker member is engaged in an opening 105 of a slide 106 having a cam surface 107 in its underface. This slide is mounted on the frame, and its cam surface 107 is adapted to engage the beveled or inclined edge 97 of the head 96 of the bushing 87. The slide is also provided with an elongated opening 108 through which the knock-out rod 91 extends. With this construction when the slide 106 is actuated, the sleeve or bushing 87 will be moved forwardly, thus moving the die 69 forwardly through the pins 89 and break the bond between the blank and the punch 80.

The arm 104 of the rocker member 101 will engage the outer projecting end of the knock-out rod 91 and move this rod forwardly to actuate the pins 93 which engage the plate 94 and move the bushing 83 forwardly to eject the blank from the die. It will be understood that during this movement of the sleeve 83 the sleeve 87 is stationary due to the shape of the lower cam surface of the slide 106.

While I have shown and described one embodiment of my invention and one method of carrying out my improved process, it will be understood that it is not to be limited to all of the detail shown, but is capable of modification and variation within the spirit of the invention and within the scope of the claims.

What I claim is:

1. The method of making a nut blank by performing a plurality of operations on a workpiece at different stations in the same machine which comprises cutting a workpiece from a length of round bar stock, progressively indenting said workpiece, forming a skirt portion tapering externally toward the adjacent end face of the blank at one end thereof, then piercing an opening through the workpiece while preserving its external round shape during all of the aforesaid operations, then forcing said round workpiece into a polygonal die opening having a tapered recessed punch extending into the die while holding said punch stationary and moving said die and workpiece therein relatively to the punch, and in a direction axially of the punch, to shape the exterior of the blank into noncircular form and simultaneously form a tapered bore in the blank having a key extending from the side wall of the blank into the tapered bore.

2. The method of forming a nut blank as in claim 1 wherein, after the forming operation in the polygonal die opening, the die and workpiece are first moved outwardly relatively to the punch to break the bond between the die and the punch and thereafter the blank is ejected from the die.

References Cited in the file of this patent

UNITED STATES PATENTS

| 2,378,609 | Wesley | June 19, 1945 |
| 2,743,466 | Friedman | May 1, 1956 |
| 2,756,444 | Schaeffer | July 31, 1956 |

FOREIGN PATENTS

| 238,363 | Switzerland | July 15, 1945 |